US009686669B2

(12) United States Patent
Devarapalli et al.

(10) Patent No.: US 9,686,669 B2
(45) Date of Patent: Jun. 20, 2017

(54) METHOD OF CONFIGURING A MOBILE NODE

(75) Inventors: Vijay Devarapalli, Santa Clara, CA (US); Basavaraj Patil, Coppell, TX (US); Mohan Parthasarathy, Sunnyvale, CA (US); Hannu Flinck, Helsinki (FI); Meghana Sahasrabudhe, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 2177 days.

(21) Appl. No.: 11/077,491

(22) Filed: Mar. 11, 2005

(65) Prior Publication Data

US 2005/0228893 A1 Oct. 13, 2005

Related U.S. Application Data

(60) Provisional application No. 60/560,253, filed on Apr. 8, 2004, provisional application No. 60/569,177, filed on May 7, 2004.

(51) Int. Cl.
*G06F 15/16* (2006.01)
*H04W 8/06* (2009.01)
*H04L 29/06* (2006.01)
*H04W 80/04* (2009.01)

(52) U.S. Cl.
CPC ............ *H04W 8/065* (2013.01); *H04L 63/08* (2013.01); *H04L 63/162* (2013.01); *H04W 80/04* (2013.01)

(58) Field of Classification Search
CPC ..... H04L 63/08; H04L 63/162; H04L 9/3271; H04W 8/065; H04W 8/26; H04W 80/04; H04W 12/06; H04W 92/02

USPC ............... 709/228, 220; 455/432.1
See application file for complete search history.

(56) References Cited

U.S. PATENT DOCUMENTS

| | | | |
|---|---|---|---|
| 5,613,204 A * | 3/1997 | Haberman et al. ......... 455/432.3 |
| 6,496,704 B2 * | 12/2002 | Yuan ............................. 455/466 |
| 6,501,746 B1 | 12/2002 | Leung |
| 7,171,555 B1 * | 1/2007 | Salowey et al. .............. 713/156 |
| 2002/0089958 A1 * | 7/2002 | Feder et al. .................. 370/338 |
| 2002/0114323 A1 * | 8/2002 | Chowdhury et al. ......... 370/352 |
| 2002/0133607 A1 * | 9/2002 | Nikander ...................... 709/229 |
| 2003/0091030 A1 * | 5/2003 | Yegin et al. .................. 370/352 |
| 2003/0119481 A1 * | 6/2003 | Haverinen et al. ........... 455/411 |
| 2003/0142673 A1 * | 7/2003 | Patil et al. .................... 370/392 |

(Continued)

FOREIGN PATENT DOCUMENTS

| | | |
|---|---|---|
| EP | 1 139 634 A2 | 10/2001 |
| WO | WO 02/063848 A2 | 8/2002 |
| WO | WO 2004/112348 A1 | 12/2004 |

OTHER PUBLICATIONS

U.S. Appl. No. 60/479,156, filed Jun. 18, 2003.*

(Continued)

*Primary Examiner* — June Sison
(74) *Attorney, Agent, or Firm* — Mintz Levin Cohn Ferris Glovsky and Popeo, P.C.

(57) ABSTRACT

A method of communication that includes sending a first message from user equipment to a server, requesting a home agent and/or a home address. The method also includes authenticating the user equipment and providing the home agent and/or home address only when the user equipment is authenticated. Also, a communication system, a server, and user equipment that are configured to implement the method.

46 Claims, 7 Drawing Sheets

(56) References Cited

U.S. PATENT DOCUMENTS

| | | | | |
|---|---|---|---|---|
| 2003/0227937 | A1* | 12/2003 | Abrol et al. | 370/457 |
| 2004/0047348 | A1* | 3/2004 | O'Neill | 370/389 |
| 2004/0114553 | A1* | 6/2004 | Jiang et al. | 370/328 |
| 2004/0137888 | A1* | 7/2004 | Ohki | 455/417 |
| 2005/0078824 | A1* | 4/2005 | Malinen et al. | 380/247 |
| 2005/0165953 | A1* | 7/2005 | Oba et al. | 709/238 |
| 2005/0266842 | A1* | 12/2005 | Nasielski et al. | 455/432.1 |
| 2006/0185013 | A1* | 8/2006 | Oyama et al. | 726/21 |
| 2007/0124592 | A1* | 5/2007 | Oyama | 713/171 |
| 2007/0171870 | A1* | 7/2007 | Oba et al. | 370/331 |
| 2007/0230453 | A1* | 10/2007 | Giaretta et al. | 370/389 |
| 2008/0095084 | A1* | 4/2008 | Nakahara et al. | 370/310 |
| 2008/0101291 | A1* | 5/2008 | Jiang et al. | 370/331 |
| 2009/0172183 | A1* | 7/2009 | Derksen et al. | 709/232 |
| 2009/0300097 | A1* | 12/2009 | Meyer | 709/203 |

OTHER PUBLICATIONS

U.S. Appl. No. 60/551,039, filed Mar. 9, 2004.*

Request for Comments (RFC) #3041; Microsoft Research; Narten et al.; Jan. 2001.*

Frank Vahid, "The Softening of Hardware," Computer, vol. 36, No. 4, pp. 27-34, Apr. 2003, doi:10.1109/MC.2003.1193225.*

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

IETF draft "AAA for IPV6 Network Access" (May 1, 2003) to Perkins et al; draft-perkins-aaav6-06.txt.*

Provisional 60/510,787 (Oct. 13, 2003).*

Technical standard document "Stronger Access Authentication Mechanism for Mobile Stations" (S40-20040315-010) (Mar. 15, 2003) to 3rd Generation Partnership Project 2 (3GPP2)—Nokia. ("3GPP2-Nokia").*

Technical standard document "cdma2000 Wireless IP Network Standard" (3GPP2 X.S0011-001 through 006-C: chapters 1-6) (Aug. 2003) to 3rd Generation Partnership Project 2 (3GPP2).*

Technical standard document "Dynamic Assignment of Home Agent and Home Address for MIPv6" (X31-20040419-xxx) (Apr. 19, 2004) to 3rd Generation Partnership Project 2 (3GPP2)—Nokia.*

IETF draft "PPP Authentication for deploying Mobile IPv6 in cdma2000" (Sep. 10, 2003) to Tacsik, E. (draft-tacsik-mipv6pppauth-cdma2k-00.txt).*

Mobile IPv4 Extension for carrying Network Access Identifiers (Dec. 12, 2003) (draft-ietf-mip4-aaa-nai-02) to Johansson et. al.*

RFC 3344 IP Mobility Support for IPv4 (Aug. 2002) Perkins.*

RFC 3162 Radius and IPv6 (Aug. 2001) Aboba.*

Stefano M. Faccin, et al., "Diameter Mobile IPv6 Application", AAA WG Internet—Draft, Apr. 2003, pp. 1-33.

L. Blunk, et al., "PPP Extensible Authentication Protocol (EAP)", XP-002239395, Network Working Group Request for Comments, Mar. 1, 1998, pp. 1-15.

D. JohnsonRice University, C. Perkins Nokia research Center, J. Arkko Ericsson., "Mobility Support in IPv6 draft-ietf-mobileip-ipv6-22.txt", IETF Mobile IP Working Group Internet-Draft, May 26, 2003, pp. 1-174.

Thomas Narten, IBM, Richard Draves, Microsoft Research., "Privacy Extensions for Stateless Address Autoconfiguration in IPv6 <draft-ietf-ipngwg-temp-addresses-v2-00.txt>", Internet-Draft, Sep. 23, 2002, pp. 1-21.

* cited by examiner

METHOD OF CONFIGURING A MOBILE NODE

CROSS-REFERENCE TO RELATED APPLICATION

The present application claims priority to U.S. Provisional Patent Application No. 60/560,253, filed Apr. 8, 2004, and entitled "METHOD OF CONFIGURING A MOBILE NODE", and U.S. Provisional Patent Application No. 60/569,177, filed May 7, 2004, and entitled "DYNAMIC HOME ADDRESS GENERATION BY AAA FOR MOBILE IPV6".

FIELD OF THE INVENTION

The present invention relates to a method of communication.

BACKGROUND OF THE INVENTION

A communication system is a facility which enables communication between two or more entities such as user terminal equipment and/or network entities and other nodes associated with a communication system. The communication may comprise, for example, communication of voice, electronic mail (email), text messages, data, multimedia and so on.

The communication may be provided by a fixed line and/or wireless communication interface. A feature of wireless communication systems is that they provide mobility for the users thereof. An example of communication systems providing wireless communication are public land mobile networks (PLMN). An example of the fixed line system is a public switched telephone network (PSTN).

A communication system typically operates in accordance with a given standard or specification which sets out what the various elements of a system are permitted to do and how that should be achieved. For example, the standard or specification may define if the user, or more precisely user equipment, is provided with a circuit switched server or a packet switched server or both. Communication protocols and/or parameters which should be used for the connection also typically defined. For example, the manner in which communication should be implemented between the user equipment and the elements of the communication networks is typically based on a predefined communication protocol. In other words, a specific set of "rules" on which the communication can be based needs to be defined to enable the user equipment to communicate via the communication system.

So called third generation communication systems are being introduced. These so called third generation systems use code division multiple access techniques. One example of such a third generation communication system is the cdma2000 system (Code Division Multiple Access, version 2000 (including data)).

Current cdma2000 networks support three modes of service, simple IP (internet protocol) v4, simple IPv6 and mobile IPv4. The next release of cdma2000 packet data network (see proposed standard TIA 835D) plans to have mobile IPv6 as a fourth mode of service for the mobile station. The requirements for IPv6 mobility in cdma2000 have required that the dynamic assignment of home address and home agent for a mobile station be possible.

A mobile station is identified by a unique home address through which it is always reachable. A home agent is a router that serves mobile stations that belong to the home network that the home agent serves.

The current mobile IPv6 specification does define a mechanism for dynamic home agent assignment. However, this mechanism is undesirable in that it is not secure. In practice, home agents in cellular operator networks are not likely to respond to unauthenticated requests with a list of home agents. Furthermore, no mechanism for dynamic assignment of home address is provided in the current mobile IPv6 specification.

It is an aim of embodiments of the present invention to address or at least mitigate the above described problems.

SUMMARY OF THE INVENTION

According a first aspect of the present invention, there is provided a method of communication comprising the steps of sending a message from user equipment to a server requesting at least one of a home agent and a home address, authenticating said user equipment and providing said requested at least one of a home agent and a home address only if said user equipment is authenticated.

According to a second aspect of the present invention, there is provided a communication system comprising user equipment, a server and authentication means, said user equipment comprising means for sending a message from user equipment to a server requesting at least one of a home agent and a home address, said authentication means being arranged to authenticate said user equipment and to provide said requested at least one of a home agent and a home address only if said user equipment is authenticated.

According to a third aspect of the present invention, there is provided a server for use in a communication system comprising user equipment, said server and authentication means, said server comprising means for receiving from user equipment a request for at least one of a home agent and a home address, said server being arranged to store information relating to said request.

According to a fourth aspect of the present invention, there is provided a user equipment for use in a communication system comprising said user equipment, a server and authentication means, said user equipment comprising means for sending a message from user equipment to a server requesting at least one of a home agent and a home address, and means for receiving said requested at least one o-f a home agent and a home address only if said user equipment is authenticated.

According to a fifth aspect of the present invention, there is provided a method of communication comprising the steps of sending a message from user equipment to a server requesting home network information, authenticating said user equipment and providing said requested home network information only if said user equipment is authenticated.

According to a further aspect of the invention, a method of communication is provided. The method comprises the steps of determining the need for assigning at least one of a home agent and a home address to a user equipment; authenticating said user equipment; and providing said at least one of said home agent and said home address only if said user equipment is authenticated and if the step of determining the need indicated that assigning of at least one of a home agent and a home address is needed.

The determination of the need for assigning at least one of a home agent and a home address to a user equipment can be performed based on a request received from the user equipment.

The determination of the need for assigning at least one of a home agent and a home address to a user equipment can be performed based on profile information of the user equipment.

According to a further aspect of the invention, a node for a communication system is provided. The node comprises authentication means, means for obtaining profile information of a user equipment, means for determining whether a user equipment is capable of mobile IPv6 operation based on profile information of the user equipment; said authentication means being arranged to authenticate a user equipment and to provide at least one of said home agent and said home address only if said user equipment is authenticated and if said user equipment is capable of mobile IPv6 operation.

BRIEF DESCRIPTION OF DRAWINGS

For a better understanding of the present invention and as to how the same may be carried into effect, reference will now be made by way of example to the accompanying drawings in which.

DETAILED DESCRIPTION OF PREFERRED EMBODIMENTS OF THE PRESENT INVENTION

Figure 1:
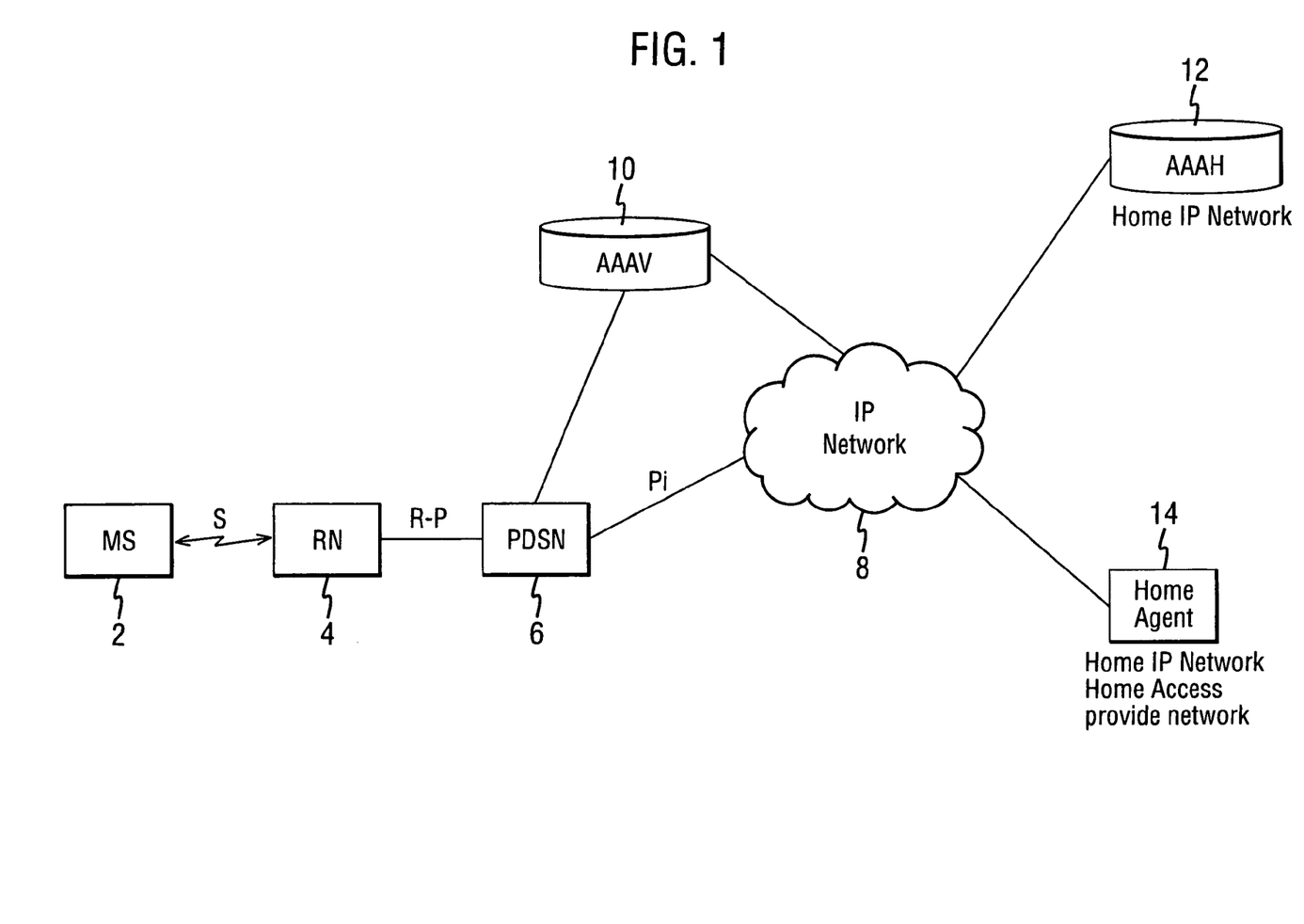
FIG. 1 shows a network in which embodiments of the present invention can be implemented.

Reference is first made to FIG. 1 which shows a network in which embodiments of the present invention can be incorporated. This network is, by way of example a cdma2000 packet data network. It should be appreciated that embodiments of the present invention may be applied to any other network conforming to any other suitable standard. Other standards could for example include other third generation standards but are not limited thereto.

User equipment is provided which may be a mobile station. The user equipment can take any suitable format. For example, the user equipment may be a portable computer, mobile telephone, personal data assistant, organiser or the like.

In this embodiment the user equipment is a mobile station 2 arranged to communicate with a radio network RN 4 via a wireless connection 5. The radio network 4 may comprise, for example, base stations and base station control functions. The radio network 4 is connected to a packet data support node (PDSN) 6. The PDSN 6 provides the network access gateway functionality. The PDSN is arranged to communicate with an IP network 8. The PDSN permits communication from the mobile station and to the mobile station to be routed via the IP network 8.

The PDSN 6 is also connected to an authentication, authorisation and accounting server 10. In the example shown in FIG. 1, the mobile station is not in its home network. Accordingly, the AAA entity 10, to which the PDSN 6 is connected, will be that of the visited network. This entity will be referred to as the AAAV 10. The AAAV 10 is also able to communicate with the IP network 8.

The IP network 8 is connected to the authentication, authorisation and accounting server 12 in the user's home IP network. This is the AAAH 12.

The IP network 8 is also connected to the home IP network 14 of the mobile station.

Figure 2:
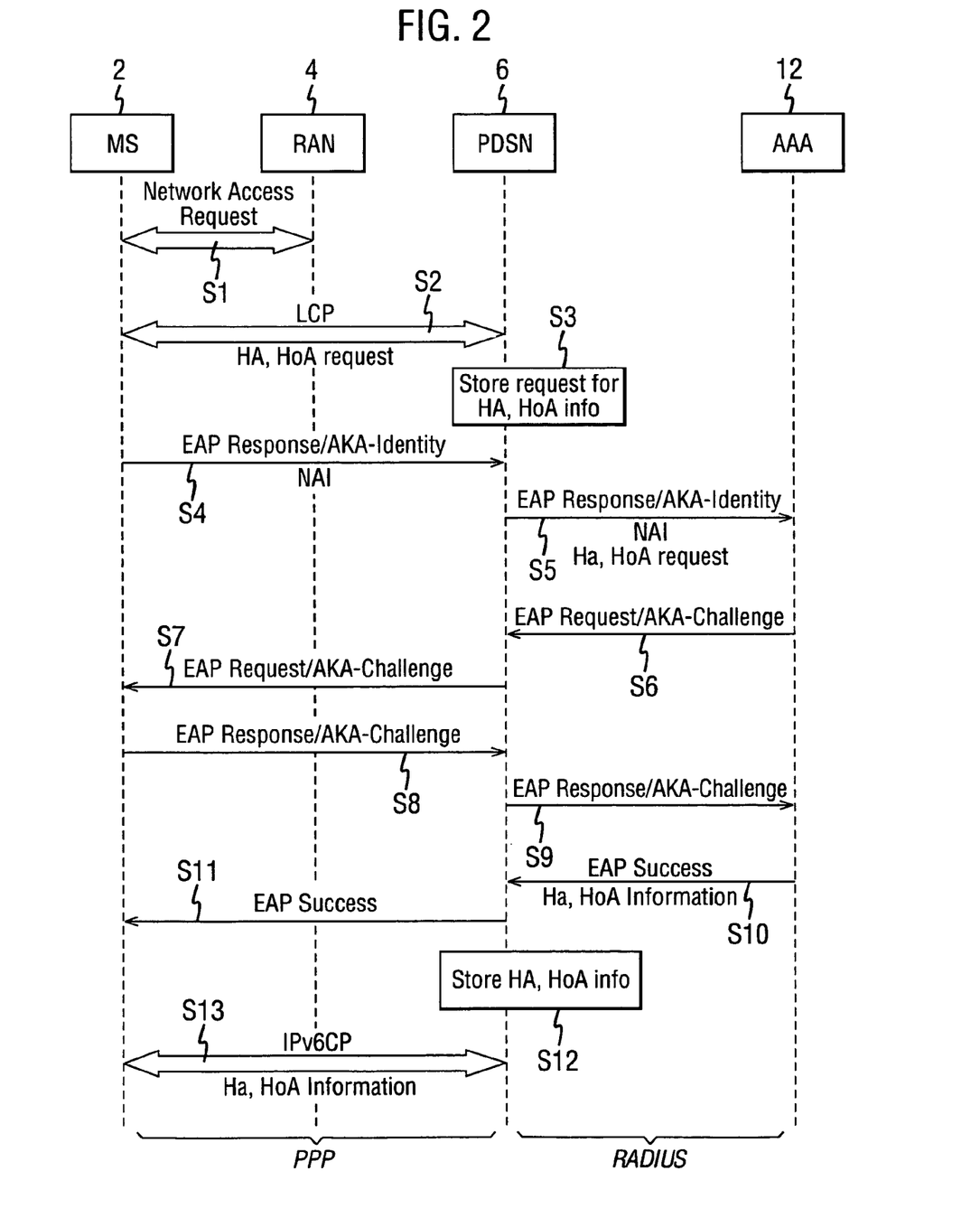
FIG. 2 shows the signal flow for dynamic assignment of the home address and home agent, in one embodiment of the present invention.

Reference will now be made to FIG. 2 which shows the signalling flow in a first embodiment of the present invention. Shown in FIG. 2 are the mobile station 2, the radio network 4, the PDSN 6 and the AAAH 12 (indicated as AAA in FIG. 2).

Before describing the signal flow in detail, the process will be summarised. The PDSN 6 authenticates the mobile station before network access is granted. In this embodiment, EAP (extensible authentication protocol) is used as an authentication protocol during the PPP point to point protocol phase. The home agent and home address assignment is tied to the authentication to the PDSN. Thus, once the mobile station authenticates itself to the PDSN 6, it also obtains the home agent and home address configuration information. The use of EAP is not a standard mechanism in cdma2000 networks for authenticating the Mobile Station currently.

The current 3GPP2 standards have PAP/CHAP (password authentication protocol/challenge handshake authentication protocol) as the default mechanism. Embodiments of the invention will also work when PAP/CHAP is used.

The use of EAP is not the standard mechanism in cdma2000 networks for authenticating the MS. In embodiments of the invention which use PAP/CHAP, again the assignment of Home Address and Home Agent is to the MS occurs only when the MS succeeds in authenticating itself—to the network. If the authentication fails, the MS should be not assigned a Home Agent or Home Address.

Embodiments of the invention tie the assignment of Home Address and Home Agent to the MS only when the MS succeeds in authenticating itself to the network. If the authentication fails, the MS should be not assigned a Home Agent or Home Address.

The signal flow shown in FIG. 2 will now be described in detail. In step S1, a network access request procedure is carried out between the mobile station 2 and the radio network 4.

In step S2, in this example, the mobile station 2 does not have a home address or a home agent configured and therefore this is indicated to the PDSN 6 during the LCP link control protocol phase of PPP that it needs the home agent and/or home address to be specified. Thus, the signalling in step S2 is between the mobile station 2 and the PDSN 6.

Figure 3:
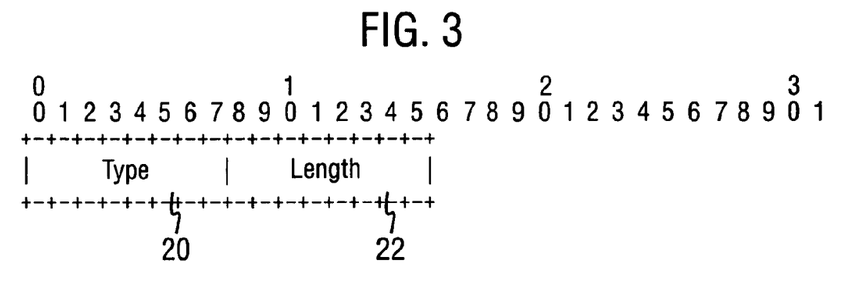
FIG. 3 shows a request for a mobile station to indicate that it needs a home address and home agent configured.

For the mobile station to indicate to the PDSN 6 that it needs a home agent and a home address to be assigned, a new LCP configuration option is defined. This is shown in FIG. 3. The message would be a mobile IPv6 configuration required option. This option would be present only in a LCP Configure Request message sent from the mobile station to the PDSN. This indicates to the PDSN that the mobile station needs mobile IPV6 configuration information. As can be seen from FIG. 3, there is a type field 20. The type field is an 8 bit field indicating the type of LCP configuration option. There is also a length field 22 which is an 8 bit field indicating the length of the option in bytes. In this example, it is set to 2 for this LCP option. This message is only provided if home address and/or home agent information is required.

Referring back to FIG. 2, the next step is step S3. In step S3, the PDSN 6 stores the request for home agent and home address information.

In step S4, the mobile station sends to the PDSN 6 an EAP (extensible authentication protocol) Response/AKA (authentication and key agreement)—Identity message including the NAI (network access identifier) associated with the user equipment. This is a standard message in the EAP protocol.

EAP AKA authorisation is defined in the Internet Engineering Task Force draft called "draft-arkko-pppext-eap-aka". The EAP AKA-Identity messaging can be used in order to obtain the mobile station identity. The mobile station will send the EAP-response/AKA-Identity message which will include identity information about the user.

In step S5, the EAP Response/AKA-Identity message is sent from the PDSN 6 to the AAAH 112 along with a RADIUS (remote authentication dial in user service) attribute containing the home agent, home address information request. The RADIUS attribute is provided from the information stored by the PDSN 6.

In step S6, the AAAH 12 sends an EAP Request/AKA-Challenge message to the PDSN 6. This starts the authentication after the mobile user identity has been successfully provided.

The PDSN 6 forwards the EAP Request/AKA-Challenge to the mobile station in step S7.

In step S8, the mobile station replies with a EAP Response/AKA-Challenge which is sent in step S8 to the PDSN. This response is sent in response to a valid challenge request.

This response is forwarded in step S9 from the PDSN 6 to the AAAH 12. The AAAH 12 then completes the authentication of the mobile station. If this is successful, it sends an EAP Success message, indicating successful authentication, in step S10 to the PDSN along with the home agent and address information.

In step S11, the EAP Success message is sent from the PDSN 6 to the mobile station 2.

In step S12, the home agent and home address information is stored in the PDSN. It should be appreciated that in embodiments of the present invention steps S11 and S12 can be reversed or take place at the same time.

In step S13, which is the IPv6 CP (configuration protocol) phase of PPP, the PDSN 6 forwards the home address and home agent information that is received from the AAAH 12 to the mobile station. Thus, at the end of PPP set up, the mobile station has the home agent and home address information configured.

Figure 4:
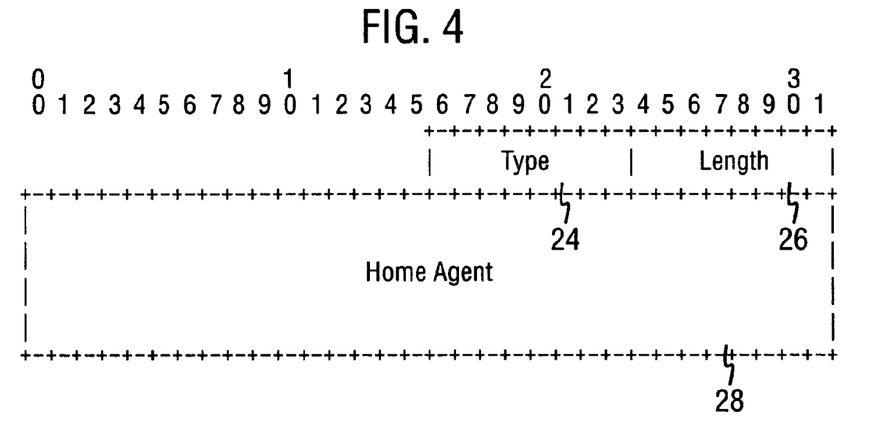
FIG. 4 shows a message for providing home agent information.

For the PDSN to be able to return the agent and home address information during the IPv6 CP phase, two new IPv6 CP options are defined. The first is shown in FIG. 4 which shows the home agent IPv6 CP option. This carries the IPv6 address of the home agent. The message has three fields. The first field 24 is an 8 bit field indicating the type of the IPv6 CP option. The second field 26 is an 8 bit field indicating the length of the option. It is set to 18 in embodiments of the present invention. The third field 28 is a 16 bit field which contains the IP v6 address of the home agent assigned to the mobile station.

Figure 5:
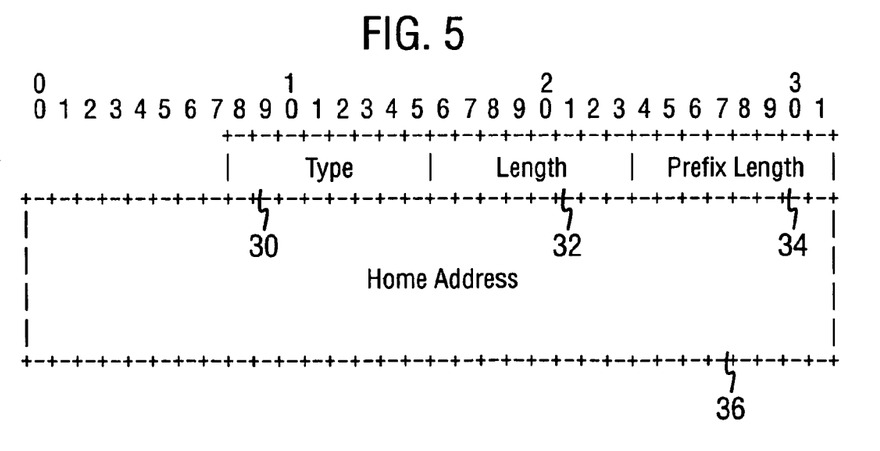
FIG. 5 shows a message for providing home address information.

FIG. 5 shows the home address IPv6 CP option. This option carries the dynamically assigned home address for the mobile station. This contains four fields. The first field 30 is the type field and is an 8 bit field indicating the type of the IPv6 CP option. The second field is an length field which is an 8 bit field indicating the length of the option. It is set to 19. There is a third field 34 which is a prefix length field which contains 8 bits. The prefix length field gives the prefix length of the IPv6 prefix from which the Home Address was configured. The fourth field 36 is the home agent field which is a 16 bit field containing the IPv6 home address assigned to the mobile station.

In one embodiment, the modifications required for the mobile station, PDSN and the home AAA server can be summarised as follows:
1. The LCP implementation on the mobile station and the PDSN needs to be modified to include the processing of the new mobile IPv6 configuration required option.
2. The PDSN needs to store the request and later send it along with the authentication messages.
3. The PDSN and AAAH have to implement new RADIUS attributes or DIAMETER AVP (attribute value pair) messages to carry the home agent and home address information.
4. The PDSN needs to store the home address and home agent information to be sent later during the IPv6 CP phase.
5. The PDSN and the mobile station implement two new IPv6 CP options to carry the home address and home agent information.

Embodiments of the present invention thus provide a solution for dynamically assigning a home agent and home address for the mobile station. Previously, no such mechanism has been defined in the cdma2000 network. In embodiments of the present invention, the assignment of the home agent and home address is tied to the authentication phase. Only if the mobile station succeeds in authenticating itself to the PDSN is the home agent and home address information delivered to the mobile station. The assignment of the home agent and home address takes place during the initial authentication phase thus avoiding any additional signalling messaging to fetch the home address and home agent information from the home AAA server.

A second embodiment of the present invention will now be described with reference to FIGS. 6 to 9. The embodiment now described is applicable to the network access authentication phase and the mobile IPv4 dynamic home agent assignment phase. This solution will also work for MIPv6 This embodiment of the invention is based on AAA-based authentication (client authentication with a network access server). Embodiments of the present invention provide a method of using the signalling required for dynamic home agent discovery in a cdma2000 network with signalling for the authentication phase. This reduces the time required for the initial MIPv4 or MIPv6 registration set up for a user in a cdma2000 network.

Figure 6:
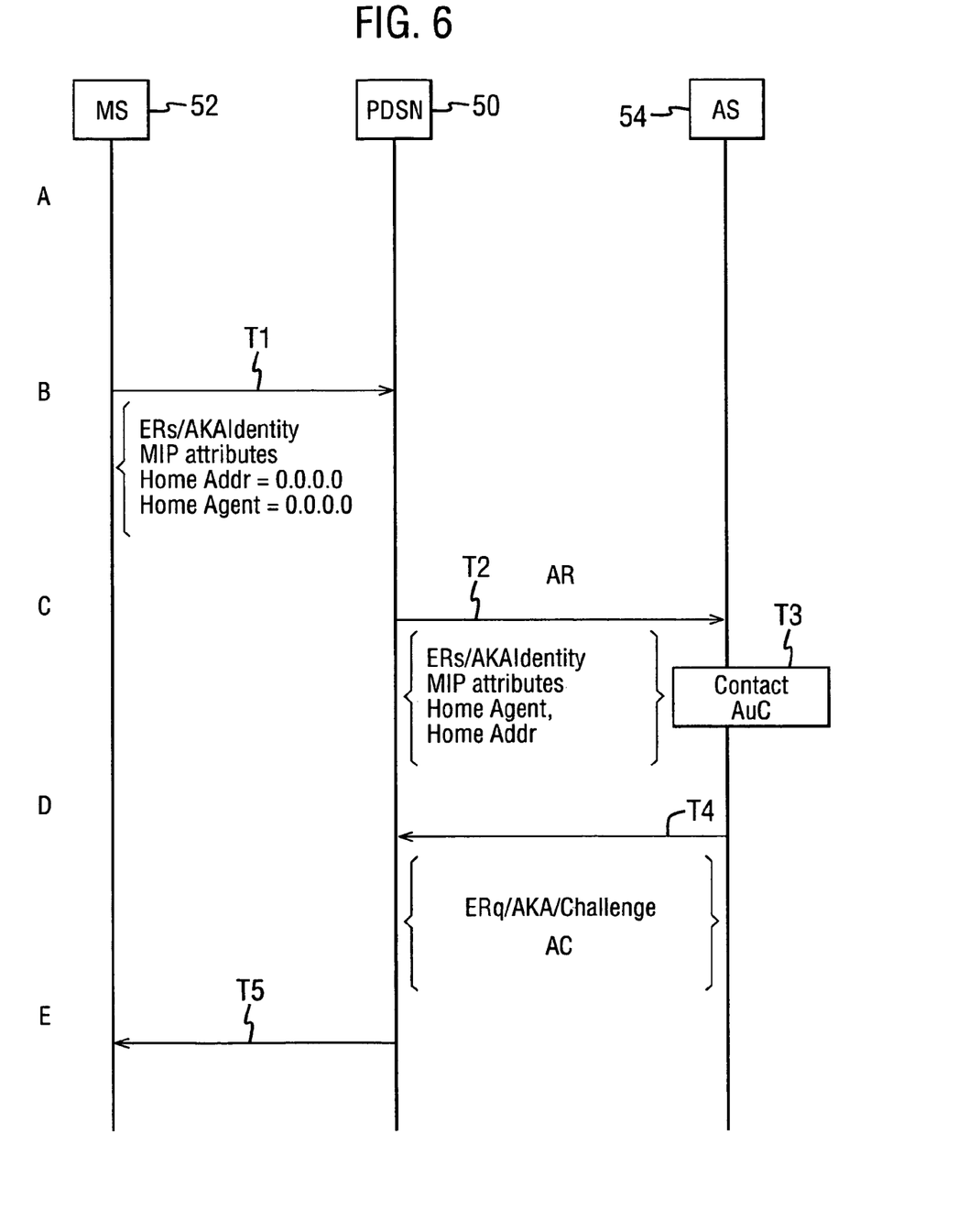
FIG. 6 shows a signalling flow in a second embodiment of the invention.

In step T1, the mobile station sends the EAP Response/AKA Identity message as part of the EAP authentication protocol in PPP. The request for a Home Address and/or a Home Agent is carried as EAP attributes inside the EAP message. The message includes the following information:
ERs EAP Response/AKA Identity In step T2, a RADIUS message, an access request, is sent from the PDSN 50 to the authentication server 54 which could be colocated with the Home AAA Server. In the following the authentication server AS will be called the AAA server henceforth. This will include the EAP message carrying the EAP attributes as defined here as well as the information included in the request message.

In step T3, the AAA server will contact the authentication centre to fetch the AKA authentication vectors. In response to information received in step T3, the AAA server in step T4 sends an EAP Request/AKA-Challenge message to the PDSN 50. This message is forwarded by the PDSN 50 to the mobile station 52 in step T5.

In step T6, AKA processing is carried out by the mobile station. The mobile station verifies that the value of AUTN (authentication token) which it received in the message matches its own calculated value. This authenticates the network to the client. In step T7 an EAP Response/AKA-Challenge response is sent to the PDSN.

In step T8, the message from the mobile station is forwarded by the PDSN to the AAA server.

In step T9, the AAA server compares authentication values (more specifically the RES value) received from the mobile station with authentication values received from the authentication centre.

If the mobile station is authenticated, the AAA server sends in step T10 an EAP Success message along with the EAP attributes carrying a home address and a home agent address. This message will be encapsulated in an Access accept message.

In step T11, status information along with the home address and home agent information is sent by the PDSN 50 to the mobile station 52. An EAP success message authenticates the client to the network.

In step T12, the mobile station 52 sends a MIPv4 RRQ Registration Request or a Binding Update in case of MIPv6 to assigned home agent.

Figure 7:
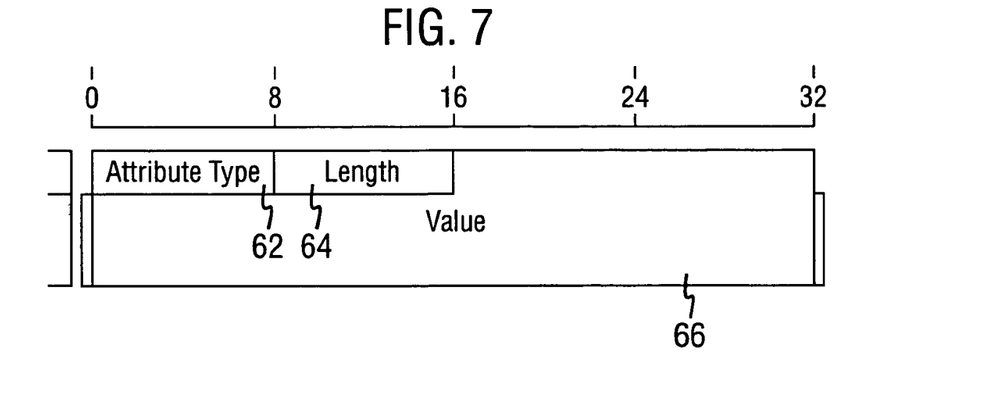
FIG. 7 shows the general attribute format.

Reference is made to FIG. 7 which shows the EAP/AKA attribute format. A first field 62 provides information about the attribute type. A second field 64 provides information about the length and a third field 66 shows the value of the attribute.

Figure 8:
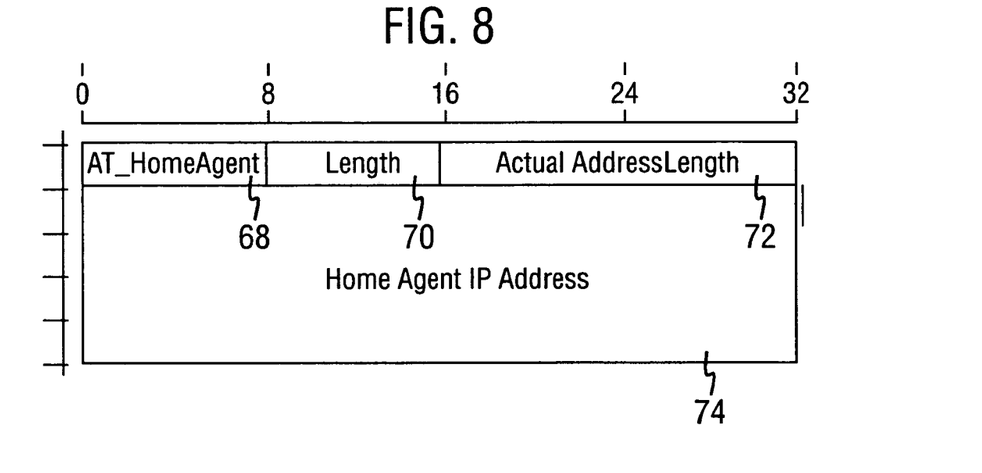
FIG. 8 shows the home agent attribute format.

In FIG. 8, the home agent attribute is shown. This has a first field 68 indicating that it is the home agent attribute. A second field 70 indicates the attribute length, the third field 72 indicates the actual address length and the fourth field 74 indicates the home agent IP address.

Figure 9:
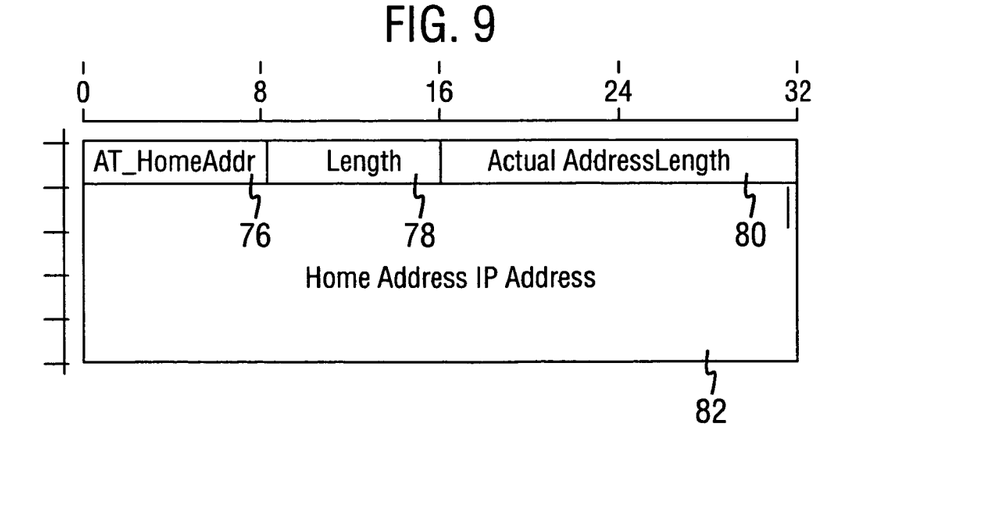
FIG. 9 shows the home address attribute format.

In FIG. 9, the home address attribute is shown. This has a first field 76 indicating that it is the home address attribute. A second field 78 indicates the attribute length, the third field 80 indicates the actual address length and the fourth field 82 indicates the home IP address.

Thus, in certain embodiments of the present invention the EAP/AKA authentication messages are used. The home agent and home address are additional attributes in EAP-AKA. These attributes get carried from the PDSN to the home AAA server inside the EAP-AKA message that is being sent as an attribute of the access request message. On receiving the access request message, the home AAA server determines the home agent to be assigned based on a selection procedure and includes its IP address as an EAP attribute in the EAP success message. The EAP success message is carried in the access accept message from the home AAA server to the PDSN. The MIPv4 registration request or MIPv6 Binding Update is then sent to the assigned home agent by the mobile station.

EAP-AKA authentication procedure involves a few rounds of signalling between the mobile station, the PDSN and the home AAA server. In the first round of messages, the PDSN and AAA server exchange the access request and access challenge messages. In the second round of messages the PDSN and AAA server exchange the access challenge and access Accept messages. If the home agent discovery is also done during this authentication phase, it reduces the rounds of message exchange between the PDSN and home AAA server required before the MIP v4 registration can proceed.

Embodiments of the present invention provide an optimisation that combines the two message exchanges thus reducing the number of control messages and more importantly reduces the time required to complete an MIP v4 registration for a mobile station in an absence of a static home agent address. Additionally, this embodiment requires less state to be stored in the PDSN. In other words, there is no need to block the MIP RRQ for the time of home agent assignment.

Embodiments of the present invention are applicable to CDMA networks if they use EAP/AKA but also can be used in the generic case where the network access authentication is done by EAP-AKA and the MIP client requests dynamic home agent allocation.

Embodiments of the present invention provide an unified message exchange for between the PDSN and the home AAA server for authentication of a user to the network and for requesting a dynamic home agent assignment for the user. Message unification is achieved by using the same AAA back end messages for exchanging the relevant information between the two network entities. A further optimisation in embodiments of the present invention includes the ability to request both the dynamic home address and the dynamic home agent address at the same time.

In one embodiment of the present invention the home AAA server could also be the authentication server.

When the mobile station does not have a valid home agent or home address it will indicate this in the EAP message by including the corresponding MIP attributes. The PDSN relays these EAP attributes to the home AAA server as part as the EAP/AKA messaging. The home AAA server assigns a home agent and/or home address by including the corresponding attributes for example, the home agent attribute in the final EAP success message. The PDSN will relay these attributes to the mobile station in the subsequent exchange message to the mobile station that completes the EAP-AKA transaction.

The message exchange between the mobile station and PDSN could be the EAP authentication part of PPP or inside 802.1x messages on any network layer access link protocol such as AAAv6 or PANA Protocol for carrying Authentication for Network Access (http://www.ietf.org/html.charters/pana-charter.html (IETF Internet Engineering Task Force)) or any other protocol that is suitable.

The mobile station will then be ready for mobile IP operation.

Embodiments of the present invention may be used in for example an operator wireless local area network (OWLAN).

Embodiments of the present invention have used RADIUS. This is because cdma2000 specification have currently defined only RADIUS for dynamic home agent discovery. Of course, any other protocol can be used. For example, DIAMETER may alternatively be used.

Embodiments of the invention can be applied in any other suitable network and not just cdma2000. The other networks may be third generation or otherwise.

Embodiments of the invention may pertain generally to packet data networks and in particular to dynamically assigning a Home Address to a mobile device in a CDMA network that is also a MobileIPv6 Mobile Node and does not have a static Home Address.

Embodiments of the invention described use of MobileIPv6 standardization for 3GPP2 packet data networks but in alternative embodiments of the invention may use different standardization.

Embodiments of the invention address the problem of assigning a home address to a MobileIPv6 MN (mobile node) that does not have a static home address. The Mobile-IPv6 specification (RFC 3775 Mobility Support in IPv6, Internet Engineering Task Force, May 2004) does not have any provision for assigning a home address dynamically. The assumption in MobileIPv6 is that the Mobile Node always has an assigned Home Address. Thus the problem needs to be solved in CDMA networks. In CDMA networks the AAA infrastructure can be utilized for assigning the address and also authorizing the use of this address by the mobile node.

As discussed above the Home AAA Server (HAAA) assigns both the Home Agent and Home Address to the MS. However, there may a problem regarding if HAAA manages a pool of thousands of addresses. Embodiments of the present invention as discussed in relation to FIG. 10 discloses a method for generation of a home address by the Home AAA server which addresses the concern regarding large pool of addresses.

Prior art documents include:
[RFC 3775] Mobility Support in IPv6, Internet Engineering Task Force, May 2004
[P.S0001-B] 3GPP2: Wireless IP Network Standard, P.S0001-B v1.0.0, October 2002.
[RFC 3041] Privacy Extensions for Stateless Address Autoconfiguration in IPv6.
Vendor Specific Protocol Section 3 http://www.ietf.org/internet-drafts/draft-ietf-pppext-vendor-protocol-02.txt.

Figure 10:
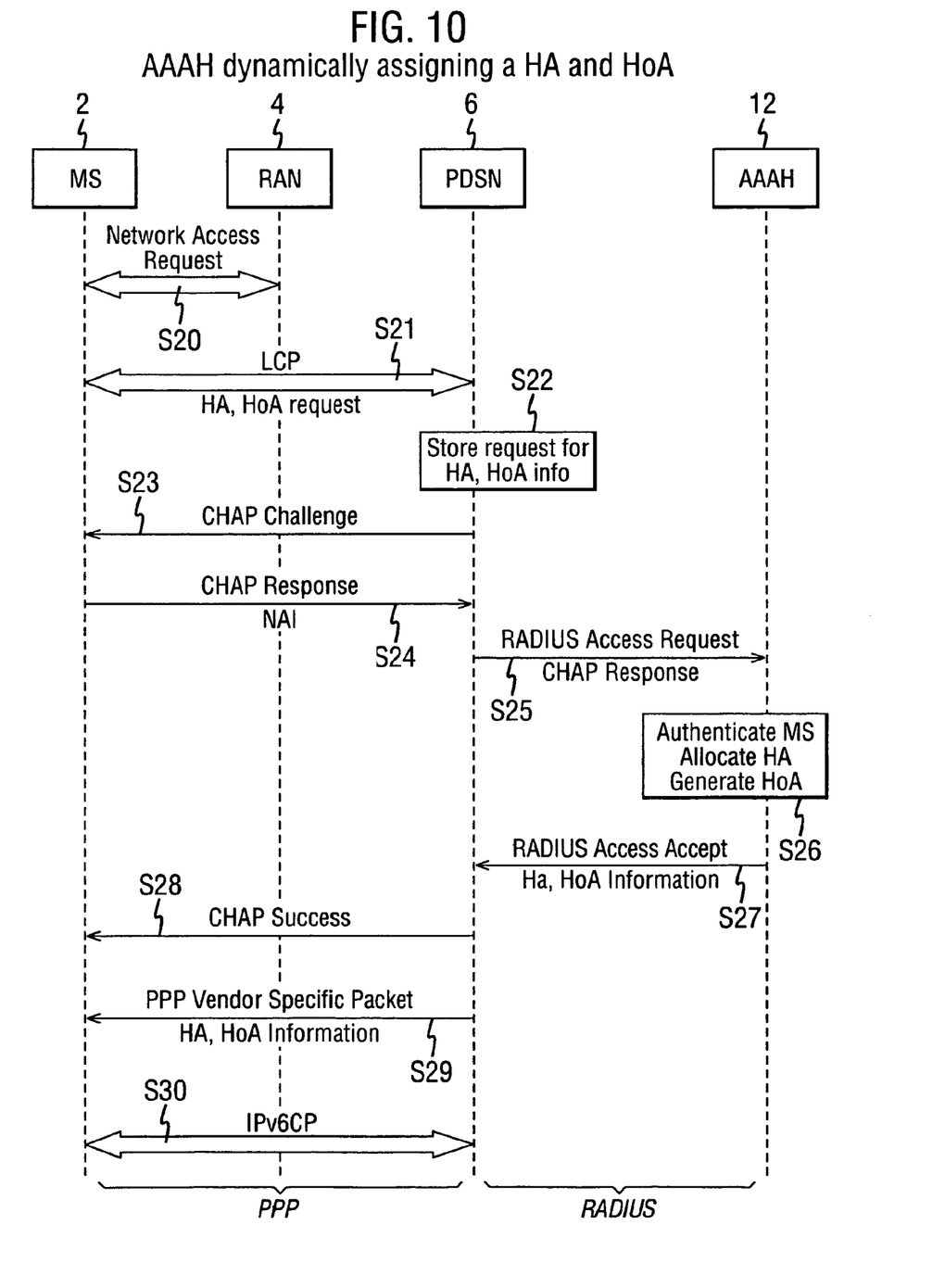
FIG. 10 shows AAAH (Authentication, Authorization and Accounting home server) dynamically assigning a HA Home Agent and HoA Home Address, in accordance with another embodiment of the present invention.

In embodiments of the present invention as exemplified by FIG. 10, a system specifies a method of selecting a home address for a MS (mobile station) requesting dynamic Home Address assignment. The method described in relation to FIG. 10 can be implemented in a system such as shown in FIG. 1.

The AAA Home Server generates a randomized interface identifier based on the Home Prefix of the assigned Home Agent. It forms a Home address by concatenating the Home prefix with the interface identifier. It then checks for uniqueness of this address by comparing it with all the previous home addresses it generated and assigned for other mobile nodes. If there is a match, it generates a new interface identifier and forms another home address. It conveys this home address to the MS in a RADIUS Access Accept message.

The embodiment of this invention described in relation to FIG. 10 is a solution to the problem of maintaining a large pool of Home Addresses.

Rather than the AAAH maintaining thousands of Home Addresses, it generates a Home Address every time there is a request for Home address assignment. For generating the Home Address, the AAAH uses the Home IPv6 prefix of the Mobile Station and an interface ID generated using a random algorithm. One example of this interface ID generation using a random algorithm is explained in Section 3.2 of http://www.ietf.org/rfc/rfc3041.txt?number=3041. The AAAH could use other methods too. It then supplies this Home Address to the MS through the PDSN.

RFC 3041 describes two approaches for the maintenance of the randomized interface identifier. The first assumes the presence of stable storage that can be used to record state history for use as input into the next iteration of the algorithm across system restarts. A second approach addresses the case where stable storage is unavailable and there is a need to generate randomized interface identifiers without previous state.

When stable storage is present, the algorithm used assumes the presence of a 64-bit "history value" that is used as input in generating a randomized interface identifier. The first time the system boots, a random value should be generated. Whenever a new interface identifier is generated, a value generated by the computation is saved in the history value for the next iteration of the algorithm.

In the absence of stable storage, no history value will be available so the system generates a pseudo-random sequence of interface identifiers.

In general steps S20 to S24 involve PPP setup between the MS and the PDSN. Steps S20 to S22 of FIG. 10 correspond generally to steps S1 to S3 of FIG. 2.

In step S23, a CHAP challenge is sent from the PDSN 6 to the Mobile station.

In step S24, the mobile station MS 2 replies with a CHAP response including a NAI.

In Step S25, the PDSN conveys the CHAP response to the AAAH 12 in the RADIUS message.

In Step S26, the AAAH generates a HoA for the MS in addition to assigning a Home Agent and authenticating the MS. Embodiments of the invention describe a method for generating this Home Address.

In Step S27, the AAAH sends the HA and HoA information to the PDSN in a RADIUS accept message.

In step S28, the PDSN sends a CHAP success message to the mobile station.

In Step S29, the PDSN delivers the HA and HoA information to the MS using a PPP vendor specific packet based on Vendor Specific Protocol Section 3

Step S30 of FIG. 10 corresponds to step S13 of FIG. 3.

Other solutions propose making changes to the MobileIPv6 specification. Other solutions discuss requesting the home address through a Binding Update (BU) message. The home address field in the Binding Update message is set to all zeros when the Binding Update message is sent by the MN to the HA. This changes the semantics of the BU message. RFC 3775 Mobility Support in IPv6, Internet Engineering Task Force, May 2004, states that the Home Address field in the BU should always be a global unicast address otherwise the BU will be dropped by the Home Agent.

The advantage of the solution of FIG. 10 is that it does not require changes to the MobileIPv6 specification. Also, since the network selects the Home Address, it also authorizes the use of this address by the Mobile Node. It also optimizes the assignment of the home address by doing it in parallel with the access authentication of the MS. The Home AAA server does not have knowledge of the static home addresses being used by some mobile nodes. When it checks for uniqueness of a generated home address it can only check against those home addresses that were assigned by it dynamically. This can cause a duplicate home address to go undetected until the MN sends a Binding Update to its Home Agent. The MN will then have to request another home address.

In other words, a Mobile Node that connects to a PDSN and wants access to the CDMA packet data network (FIG. 1) may desire to have MobileIPv6 service offered by the network. A mobile node that does not have a static home address requests a dynamically assigned Home Address as discussed above. The mobile node sends a request to the PDSN during the LCP phase of PPP setup. The PDSN forwards this request in the Access Request message that it sends for network authentication. If a Home Agent assignment is also being requested, the Home AAA Server first selects a Home Agent. Once the Home Agent has been selected, the Home AAA Server knows the Home Prefix being served by this Home Agent. The Home AAA Server first generates a randomized interface identifier for the MN. This can be performed in multiple ways. One standardized method for generating randomized interface identifiers is specified in [RFC 3041 Privacy Extensions for Stateless Address Autoconfiguration in IPv6]. It then forms a Home Address by appending the generated interface identifier to the Home Prefix. This Home Address is checked against all the other Home Addresses that the AAA Home Server has stored. These include the addresses that were generated and assigned by it for other mobile nodes requesting a dynamic home address. If there is a match with another home address, it generates a new interface identifier and creates a new home address. Once a unique home address is determined, the Home AAA Server sends this home address to the PDSN in the Access Accept message that also carries the successful authentication information. As discussed above the home address information is delivered to the MN by the PDSN in a PPP Vendor Specific Protocol packet as illustrated in FIG. 10 and specified in Section 3 of The MN can now send the Binding Update message to the Home Agent using the newly assigned Home Address.

In a further embodiment of the invention, the AAAH determines the need for assigning of a home address and a home agent to a user equipment based on profile information of the user equipment. In such an embodiment, the MS does not explicitly need to request a home address. Instead, the AAAH determines if a home address and a home agent should be assigned to the user equipment by inspecting the profile information of the user equipment. If the profile information of the user equipment indicates that the user equipment is capable of Mobile IPv6 service and the authentication of the mobile station is successful, the AAAH allocates a home agent and a home address for the user equipment.

Signalling in such an embodiment can proceed for example roughly according to the signalling illustrated in FIG. 2. In the following we describe differences in signalling according to an exemplary implementation of the current embodiment to that illustrated in FIG. 2. As in this embodiment the user equipment (denoted as MS in FIG. 2) does not request a home address and a home agent, such a request is not conferred to the PDSN 6 as is illustrated in step S2 of FIG. 2, nor from PDSN to AAAH as is illustrated in step S5 of FIG. 2. Further, step S3 of FIG. 2 is not performed in this example. However, after receiving the EAP Response/AKA-Identity message as illustrated in step S5 of FIG. 2, AAAH checks the profile information of the user equipment and determines from the profile information whether or not the user equipment is capable of mobile IPv6 service. After receiving the response to AKA-Challenge from the user equipment (as illustrated in step S9 of FIG. 2) and verifying that the response is valid, the AAAH allocates a home address and a home agent to the user equipment, if the profile information indicated that the user equipment is capable of mobile IPv6 service. After that, the signalling can continue as illustrated in steps S10 to S13 of FIG. 2.

This embodiment is useful especially in cases, where the AAAH knows where the user equipment is located geographically. If the user equipment is roaming very far from the home network, it may be advantageous to allocate a home agent closer to the current location of the user equipment than the home network of the user equipment. The AAAH can allocate a home agent closer to the current location of user equipment, if it determines that the currently assigned home link is very far from the current location of the user equipment.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above.

The invention claimed is:

1. A method, comprising:
receiving, at a server comprising at least one hardware processor, a first message from a user equipment requesting at least one of a home agent and a home address, the first message comprising mobile internet protocol attributes for indicating the at least one of the home agent and the home address, and the first message sent during a link control protocol phase of a point to point protocol prior to the user equipment receiving one or more authentication challenges;
authenticating the user equipment;
determining at least one of the home agent and the home address being dynamically assigned to the user equipment in response to the first message sent by the user equipment prior to the user equipment receiving the one or more authentication challenges, wherein the first message requests the at least one of the home agent and the home address, the determining taking place during the authenticating; and
providing the assigned at least one of the home agent and the home address to the user equipment only when the user equipment is authenticated, and not providing the assigned at least one of the home agent and the home address to the user equipment when authenticating the user equipment fails.

2. The method as claimed in claim 1, wherein the first message comprises a link control protocol phase configuration request message, and wherein an extensible authentication protocol success message includes the provided assigned at least one of the home agent and the home address.

3. A method, comprising:
sending, from user equipment and to a server, a message requesting home network information comprising at least one of a home agent and a home address, the sending comprising providing mobile internet protocol attributes for indicating the at least one of the home agent and the home address, and the message sent during a link control protocol phase of a point to point protocol prior to the user equipment receiving one or more authentication challenges; and
receiving, at the user equipment, the home network information only when the user equipment is authenticated, the home network information to be dynamically assigned to the user equipment during authentication of the user equipment in response to the message sent by the user equipment prior to the user equipment receiving the one or more authentication challenges, the assigned home network information not being received at the user equipment when authenticating the user equipment fails, wherein at least one tangible processor implements the sending and the receiving.

4. The method as claimed in claim 3, wherein, in the sending, the first message comprises requesting the home agent and the home address at a same time.

5. The method as claimed in claim 1, wherein the providing further comprises providing the home agent and the home address at a same time.

6. The method as claimed in claim 1, further comprising:
storing, at the server, information relating to the first message.

7. The method as claimed in claim 1, further comprising:
sending, from the server to an authentication entity, an authentication message and information relating to the at least one of the home agent and the home address.

8. The method as claimed in claim 7, wherein, in the sending from the server to the authentication entity, the authentication message comprises an extensible authentication protocol message.

9. The method as claimed in claim 7, wherein the sending from the server to the authentication entity further comprises sending the information relating to the requested at least one of the home agent and the home address as one of a remote authentication dial in user service attribute and a diameter attribute.

10. The method as claimed in claim 7, wherein the sending from the server to the authentication entity further comprises sending the information relating to the requested at least one of the home agent and the home address as at least one extensible authentication protocol attribute.

11. The method as claimed in claim 1, further comprising:
receiving an extensible authentication protocol message indicating authentication is successful, wherein the extensible authentication protocol message comprises at least one extensible authentication protocol attribute.

12. The method as claimed in claim 1, further comprising:
receiving a second message from an authentication entity at the server indicating that authentication is successful and at least one of the home agent and the home address.

13. The method as claimed in claim 1, further comprising:
storing, at the server, at least one of the home agent and the home address.

14. The method as claimed in claim 1, further comprising:
sending a second message indicating authentication is successful to the user equipment prior to the providing.

15. The method as claimed in claim 1, wherein the providing takes place in a configuration protocol phase of a point to point protocol.

16. The method as claimed in claim 15, wherein the providing further comprises providing at least one of a configuration protocol option for the home agent and a configuration protocol option for the home address.

17. The method as claimed in claim 1, wherein the providing is carried out during the authentication.

18. A system, comprising:
a user equipment;
a server;
at least one processor; and
at least one memory storing computer program code, wherein the at least one processor is configured to execute the computer program code to cause an apparatus to at least:
send a message from the user equipment to the server, the message requesting at least one of a home agent and a home address, the message comprising mobile internet protocol attributes for indicating the at least one of the home agent and the home address, and the message being sent during a link control protocol phase of a point to point protocol prior to the user equipment receiving one or more authentication challenges;
authenticate the user equipment during determination of at least one of the home agent and the home address to be dynamically assigned to the user equipment in response to the message sent by the user equipment prior to the user equipment receiving the one or more authentication challenges, wherein the message requests the at least one of the home agent and the home address;
provide the assigned at least one of the home agent and the home address to the user equipment only when the user equipment is authenticated; and
not provide the assigned at least one of the home agent and the home address to the user equipment when authenticating the user equipment fails.

19. An apparatus, comprising:
at least one processor; and
at least one memory storing computer program code, wherein the at least one processor is configured to execute the computer program code to cause the apparatus to at least:
initiate transmission of a message from a user equipment to a server, wherein the message requests at least one of a home agent and a home address, the message comprising mobile internet protocol attributes for indicating the at least one of the home agent and the home address, and the message being sent during a link control protocol phase of a point to point protocol prior to the user equipment receiving one or more authentication challenges; and
receive the at least one of the home agent and the home address only when the user equipment is authenticated, the at least one of the home agent and the home address not being received when authenticating the user equipment fails, the at least one of the home agent and the home address to be dynamically assigned to the user equipment during authentication of the user equipment in response to the message sent by the user equipment prior to the user equipment receiving the one or more authentication challenges.

20. The apparatus of claim 19, wherein the mobile internet protocol attributes comprise predetermined values for indicating the at least one of the home agent and the home address.

21. The apparatus of claim 19, wherein the apparatus is further caused to at least:
include, in the request, that the home agent and the home address be provided at a same time.

22. An apparatus, comprising:
at least one processor; and
at least one memory storing computer program code, wherein the at least one processor is configured to execute the computer program code to cause the apparatus to at least:
receive, from a user equipment, a request for at least one of a home agent and a home address, the request comprising mobile internet protocol attributes for indicating the at least one of the home agent and the home address, and the request being sent during a link control protocol phase of a point to point protocol prior to the user equipment receiving one or more authentication challenges;
initiate authentication of the user equipment;
determine at least one of the home agent and the home address to be dynamically assigned to the user equipment during authentication of the user equipment in response to the request received from the user equipment prior to the user equipment receiving the one or more authentication challenges; and provide the assigned at least one of the home agent and the home address to the user equipment only when the user equipment is authenticated, wherein the assigned at least one of the home agent and the home address is not provided to the user equipment when authenticating the user equipment fails.

23. The apparatus of claim 22, wherein the at least one memory is configured to store information relating to the message.

24. The apparatus of claim 22, wherein the apparatus is further caused to at least:

initiate transmission, to an authentication server, of an authentication message and information relating to the at least one of the home agent and the home address.

25. The apparatus of claim 24, wherein the authentication message comprises an extensible authentication protocol message.

26. The apparatus of claim 24, wherein the information relating to the requested at least one of the home agent and the home address comprises one of a remote authentication dial in user service attribute and a diameter attribute.

27. The apparatus of claim 24, wherein the information relating to the at least one of the home agent and the home address comprises at least one extensible authentication protocol attribute.

28. The apparatus of claim 22, wherein the apparatus is further caused to at least:

receive an extensible authentication protocol message indicating authentication is successful and including at least one extensible authentication protocol attribute.

29. The apparatus of claim 22, wherein the apparatus is further caused to at least:

receive a message from an authentication server indicating that authentication is successful and at least one of the home agent and the home address.

30. The apparatus of claim 22, wherein the at least one memory is configured to store at least one of the home agent and the home address.

31. The apparatus of claim 22, wherein the apparatus is further caused to at least:

initiate transmission of a message indicating authentication is successful to the user equipment prior to providing the requested at least one of the home agent and the home address.

32. The apparatus of claim 22, wherein the at least one of the home agent and the home address is provided in a configuration protocol phase of a point to point protocol.

33. The apparatus of claim 22, where processor is configured to provide information to the user equipment, the information including at least one of a configuration protocol option for the home agent and a configuration protocol option for the home address.

34. The apparatus of claim 22, wherein the apparatus comprises packet data support node.

35. The method as claimed in claim 3, wherein, in the sending, the mobile internet protocol attributes comprise predetermined values for indicating the at least one of the home agent and the home address.

36. The apparatus of claim 22, wherein the apparatus is further caused to at least:

receive the home agent and the home address, from an authentication server, at a same time.

37. The apparatus of claim 19, wherein the apparatus is further caused to at least:

include, in the request, a further request that at least one of the home agent and the home address be dynamically assigned.

38. A method as claimed in claim 1, further comprising: generating the home address.

39. A method as claimed in claim 38, wherein the generating comprises generating the home address from a home prefix and a random interface identifier, wherein the random interface identifier is based on the home prefix.

40. A method as claimed in claim 38, further comprising: checking that the generated home address is unique.

41. A method as claimed in claim 1, further comprising: assigning a home agent to the user equipment.

42. An apparatus comprising:

at least one processor; and at least one memory storing computer program code, wherein the at least one processor is configured to execute the computer program code to cause the apparatus to at least:

receive a first message from user equipment at the server, wherein the first message requests at least one of a home agent and a home address, wherein the first message comprises mobile internet protocol attributes for indicating the at least one of the home agent and the home address, and wherein the first message is sent during a link control protocol phase of a point to point protocol prior to the user equipment receiving one or more authentication challenges;

authenticate the user equipment;

determine at least one of the home agent and the home address to be dynamically assigned to the user equipment in response to the first message sent by the user equipment prior to the user equipment receiving the one or more authentication challenges, wherein the first message requests the at least one of the home agent and the home address, the determining taking place during the authenticating;

provide the assigned at least one of the home agent and the home address only when the user equipment is authenticated; and not provide the assigned at least one of the home agent and the home address when authenticating the user equipment fails.

43. An apparatus comprising:

at least one processor; and at least one memory storing computer program code, wherein the at least one processor is configured to execute the computer program code to cause the apparatus to at least:

send a message from the user equipment device to a server, the message requesting home network information comprising at least one of a home agent and a home address, the message comprising mobile internet protocol attributes for indicating the at least one of the home agent and the home address, and the message being sent during a link control protocol phase of a point to point protocol prior to the user equipment receiving one or more authentication challenges;

receive the home network information only when the user equipment device is authenticated; and not receive the assigned at least one of the home agent and the home address when authenticating the user equipment device fails, the home network information to be dynamically assigned to the user equipment device during authentication of the user equipment device in response to the message sent by the user equipment prior to the user equipment receiving the one or more authentication challenges.

44. The method as claimed in claim 1, wherein the first message is in accordance with mobile internet protocol version 6.

45. The method as claimed in claim 1, wherein at least one of the home agent and the home address includes configuration information in accordance with mobile internet protocol version 6.

46. The method as claimed in claim 1, wherein the authenticating further comprises:
   determining, from the first message, that the user equipment is enabled to receive configuration information for mobile internet protocol version 6.

\* \* \* \* \*